Patented Feb. 28, 1933

1,899,314

UNITED STATES PATENT OFFICE

THADDEUS W. CULMER, OF ROBINSON, ILLINOIS, ASSIGNOR TO LINCOLN OIL REFINING COMPANY, OF ROBINSON, ILLINOIS, A CORPORATION OF DELAWARE

PURIFICATION OF PETROLEUM AND HYDROCARBON COMPOUNDS

No Drawing. Application filed November 3, 1930. Serial No. 493,249.

The present invention relates to a process of purifying mineral oils and has particular reference to a process for removing the sulphur and sulphur compounds contained in the oil by treating the same with cadmium compounds.

Of course, I am aware that numerous methods have been proposed for removing the sulphur and other impurities from hydrocarbon oil distillates, such as gasoline and kerosene and I am fully aware that it has occurred to prior investigators in this field, that those metals which yield an insoluble sulphide in slightly acid solution, by a metathetical reaction involving a soluble salt of the said metal dissolved in the slightly acid solution and a soluble sulphide would be useful in sweetening hydrocarbon oils. A skilled chemist would readily perceive that those metals which are precipitated by $H_2S$ in acid solution in the so called "sulphide group" of the inorganic analytical scheme might, in some form, be suitable for the purpose of sweetening hydrocarbon oils and indeed many of them have been used for such a purpose.

It has been proposed, therefore, to use lead, mercury, cadmium and other heavy metals of insoluble sulphide forming characteristics, the most commonly used heavy metal for this purpose being undoubtedly lead, which is usually added to the oil to be purified in the form of a sodium plumbite solution, commonly referred to as a "lead doctor solution".

Now, I have found that cadmium ammonia compounds, that is to say, cadmium compounds which in solution yield a complex cadmium ammonia ion, give superior results in the sweetening of gasoline and other hydrocarbon oils, to compounds now in use for this purpose, since a greater proportion of impurities is removed. I have found that cadmium sulphide is not suitable in my process because it is insoluble in ammonia. I have also found that the precipitate formed by chemical reaction between the impurities and the cadmium ammonia compound may be recovered by filtering off the suspension of the same from the treated oil and then drying and roasting it, whereby the oxide is obtained. This oxide may be added directly to the unsweetened oil or it may be dissolved in nitric acid or other mineral acid, except sulphuric, and then added to the impure oil. In other words, the cadmium oxide and the ammonia may be added to the oil to be sweetened, or cadmium nitrate or cadmium nitrate together with ammonia may be added to the unsweetened oil and the complex ammonia salt formed in situ.

In carrying my invention into effect I provide any convenient means whereby the hydrocarbon oil is continuously pumped through a vessel, preferably provided with agitating means, and into which is continuously fed through an independent inlet a cadmium ammonia compound. The treated oil is then passed through a series of settling towers where the liquid mass separates into two liquid layers, one of which is the ammoniacal cadmium solution and the other of which is the treated oil containing the cadmium compound resulting from the reaction between the cadmium and the oil impurities, this cadmium compound being suspended in the oil. The aforesaid ammoniacal cadmium liquid which has separated from the reaction mass in the settling towers is pumped from the settling towers to a replenishing tank where it is enriched in cadmium content to compensate for the loss sustained during the above described treating process. It is then ready for re-use in the process.

The hydrocarbon oil containing the cadmium compound in suspension is pumped to a filter press, preferably of the Sweetland type, where the cadmium compound is removed in the form of a cake. The purified oil is pumped to a storage tank. The filter cake is dried and then oxidized in a burner, preferably of the rotary type, at a temperature of approximately 300° F., whereby cadmium oxide is obtained. The cadmium oxide may then be treated with an acid in diluted form, such as hydrochloric or nitric acid, to yield the corresponding salt, i. e., the chloride or nitrate. I prefer to use weak nitric acid and obtain cadmium nitrate. Alternatively, the cadmium oxide may be mixed directly with ammonium hydroxide and introduced into the treating vessel in this form.

As regards the amount of cadmium compound to be used in proportion to the amount of oil, it is pointed out that it will depend entirely upon the nature of the oil undergoing treatment. I find it advantageous to make an approximate quantitative analysis of the sulphur and other impurities in the unsweetened oil by any known method which is not too time consuming. Having estimated the sulphur content, I then treat the oil with a cadmium solution containing ammonia, in which the amount of cadmium present is approximately twice that which is theoretically required to react with the sulphur present. The amount of ammonia used may vary within rather wide limits, but I find that it is preferable to have an amount present which is in excess of the amount theoretically required to react with the cadmium to form the ammonia cadmium complex ion. I have found that a ten per cent excess gives excellent results.

Either gaseous ammonia, which will of course be dissolved by the moisture present, or ammonia dissolved in water may be used in the foregoing processes. If an ammonia solution is used, I prefer to use a ten per cent solution.

Normal temperatures and pressures are preferably used in the foregoing processes. Many modifications of the foregoing process will be suggested to one skilled in the art and many changes in detail may be made without departing from the spirit of the invention.

As used in the claims, the expression "low boiling hydrocarbon oils" means gasoline, kerosene and like oils.

What I claim is:

1. The process of desulphurizing low boiling hydrocarbon oils which comprises adding to the said oils a cadmium ammonia compound.

2. The process of desulphurizing low boiling hydrocarbon oils which comprises adding to the said oils a cadmium ammonia compound solution containing excess ammonia.

3. The process of desulphurizing low boiling hydrocarbon oils which comprises adding to the said oils a cadmium ammonia compound while stirring the said oils.

4. The process of desulphurizing low boiling hydrocarbon oils which comprises adding to the said oils a cadmium ammonia compound solution containing excess ammonia while stirring the said oils.

5. The process of desulphurizing low boiling hydrocarbon oils which comprises adding to the said oils cadmium oxide and ammonia.

6. The process of desulphurizing low boiling hydrocarbon oils which comprises adding to the said oils cadmium oxide and ammonia and stirring the reaction said oils.

7. The process of desulphurizing low boiling hydrocarbon oils which comprises adding to the said oils cadmium nitrate and ammonia.

8. The process of desulphurizing low boiling hydrocarbon oils which comprises adding to the said oils cadmium nitrate and ammonia while stirring the reaction said oils.

9. The process of desulphurizing low boiling hydrocarbon oils which comprises adding to the said oils cadmium nitrate and excess ammonia.

10. The process of desulphurizing low boiling hydrocarbon oils which comprises treating the said oils with cadmium ammonia nitrate.

11. The process of desulphurizing low boiling hydrocarbon oils which comprises treating the said oils with cadmium ammonia nitrate in excess ammonia while stirring the said oils.

12. The process of desulphurizing low boiling hydrocarbon oils which comprises continuously feeding the impure oil to a treating vessel, continuously adding a cadmium compound and ammonia, conducting the resulting mass to settling towers, removing the treated oil, filtering the same to recover the cadmium compound, drying and oxidizing the residue from the filtration, recovering the resulting cadmium oxide and returning the same to the process.

13. The process of desulphurizing low boiling hydrocarbon oils which comprises adding to the said oils cadmium chloride and ammonia.

14. The process of desulphurizing low boiling hydrocarbon oils which comprises adding to the said oils cadmium chloride and ammonia while stirring the reaction said oils.

15. The process of desulphurizing low boiling hydrocarbon oils which comprises adding to the said oils cadmium chloride and excess ammonia.

16. The process of desulphurizing low boiling hydrocarbon oils which comprises treating the said oils with cadmium ammonia chloride.

17. The process of desulphurizing low boiling hydrocarbon oils which comprises treating the said oils with cadmium ammonia chloride in excess ammonia while stirring the said oils.

In testimony whereof I affix my signature.

THADDEUS W. CULMER.